United States Patent [19]

Shimizu

[11] Patent Number: 4,743,817
[45] Date of Patent: May 10, 1988

[54] ELECTROMAGNETIC SERVO UNIT

[75] Inventor: Yasuo Shimizu, Utsunomiya, Japan

[73] Assignee: Honda Giken Kogyo Kabushiki Kaisha, Tokyo, Japan

[21] Appl. No.: 914,527

[22] Filed: Oct. 3, 1986

Related U.S. Application Data

[63] Continuation-in-part of Ser. No. 745,154, Jun. 17, 1985, abandoned.

[30] Foreign Application Priority Data

Jun. 22, 1984 [JP] Japan .................................. 59-129583
Jun. 22, 1984 [JP] Japan .................................. 59-129587

[51] Int. Cl.⁴ .......................................... B62D 5/04
[52] U.S. Cl. ..................................... 318/488; 318/2; 318/489; 74/388 PS; 180/79
[58] Field of Search ........................... 318/488, 489, 2; 180/6.28, 6.44, 6.48, 6.5, 79.1, 141, 142; 74/388 R, 388 PS; 310/68 B

[56] References Cited

U.S. PATENT DOCUMENTS

| Re. 23,550 | 9/1952 | Staude | 74/388 PS |
|---|---|---|---|
| 2,415,157 | 3/1945 | Bedford | 74/388 R |
| 2,417,287 | 9/1944 | Belo | 318/489 |
| 2,535,667 | 12/1950 | Burger et al. | 318/488 X |
| 2,604,613 | 7/1952 | Klass | 318/488 X |
| 2,689,318 | 7/1951 | Goertz et al. | 318/19 |
| 2,754,465 | 7/1956 | Brier | 318/488 |
| 2,877,656 | 8/1954 | Orr | 74/388 PS |
| 3,188,540 | 4/1962 | Lautzenhiser | 318/23 |
| 3,191,109 | 3/1962 | Hepner | 318/2 |
| 3,511,104 | 4/1968 | Piat | 74/388 PS |
| 4,241,804 | 10/1978 | Deiniger et al. | 180/79.1 |
| 4,250,765 | 1/1979 | Niklaus et al. | 74/388 PS |
| 4,260,918 | 4/1981 | Engle | 310/68 BX |
| 4,415,054 | 8/1982 | Drutchas | 180/142 X |
| 4,437,531 | 3/1982 | Urabe | 180/79.1 |
| 4,448,275 | 11/1981 | Kitagawa et al. | 180/79.1 |
| 4,490,657 | 10/1983 | Smith | 318/434 |
| 4,492,906 | 1/1985 | Goto et al. | 318/488 |
| 4,509,611 | 4/1985 | Kade et al. | 180/142 X |
| 4,522,278 | 6/1985 | Kitagawa et al. | 180/142 X |
| 4,530,413 | 5/1983 | Buike et al. | 180/79.1 |
| 4,538,698 | 1/1984 | Hashimoto et al. | 180/79.1 |
| 4,629,952 | 12/1986 | Shimizu | 318/432 |

FOREIGN PATENT DOCUMENTS

| 59-63265 | 4/1984 | Japan | 318/489 |
|---|---|---|---|
| 0298933 | 12/1971 | U.S.S.R. | 318/489 |

Primary Examiner—Bentsu Ro
Attorney, Agent, or Firm—Armstrong, Nikaido, Marmelstein & Kubovcik

[57] ABSTRACT

An electromagnetic servo unit is constituted with an outer casing (1), a first shaft (8) and a second shaft (5) both rotatably supported by the casing, an electric motor (101) built in the casing coaxially with the second shaft, the electric motor having an armature (10, 11) coaxially mounted on the second shaft, a torque detecting mechanism (8b, 22, 16, 21, 12) for detecting torque applied to either of the first and second shafts, and a control mechanism (21, 14, 15) for, receiving a detection signal from the torque detecting mechanism, controlling to start the electric motor. The torque detecting mechanism is arranged inside the casing, and the first and second shafts are mutually actuatably engaged with each other within the casing through the torque detecting mechanism. Preferably, the first and second shafts are coaxially supported by the casing, and have a relative angular displacement there between made use of for, when it is developed exceeding a predetermined angle range ($\theta$), starting the electric motor. The first and second shafts are adapted to serve either as an input and the other as an output shaft.

10 Claims, 4 Drawing Sheets

ELECTROMAGNETIC SERVO UNIT

This application is a continuation-in-part of U.S. patent application No. 745,154 filed June 17, 1985 now abandoned.

BACKGROUND OF THE INVENTION

1. Field of the Invention

The present invention generally relates to a servo unit. More particularly, the invention relates to an electromagnetic servo unit of the type in which input torque is electromagnetically servo-controlled for output.

2. Description of Relevant Art

Most conventional servo systems, exemplarily of those applied to power steering systems for vehicles, are constituted mainly using a hydraulic mechanism.

Such conventional hydraulic servo system, as applied to a power steering system for vehicles, have hydraulic oil from a hydraulic pump sent under pressure into a servoactuator such as a hydraulic power cylinder or hydraulic servomotor for servo control of input torque from a steering wheel. The servo control provides a controlled output for an operating element to be actuated, in accordance with the operational conditions of the steering wheel.

However, one problem in such a hydraulic servo system is that a hydraulic pump is normally put into service, whether or not an effective input is given from a steering wheel. Thus, power is uselessly consumed. An additional problem is that many component parts are employed such as an actuator, hydraulic pump, control valve, and oil reservoir. These parts occupy a relatively large space as a whole, which presents a problem in attaining a compact, lightweight design and reduced cost.

To overcome the problems of a conventional hydraulic servo system, a number of electromagnetic servo systems have already been proposed. In the U.S. Patent Publication No. 2,754,465 an electromagnetic servo system is applied to a power steering system for vehicles. According to this U.S. Patent, the electromagnetic servo system includes a direct-current motor coaxially arranged on a steering shaft interposed between a steering wheel as an input member of the power steering system and a gear as an output member thereof. A torque sensor of a well-known strain guage type is attached to the steering shaft. The torque sensor detects torque applied from the steering wheel to the steering shaft, to thereby control the direct-current motor.

Though having effectively solved conventional problems attendent the hydraulic servo system to a certain extent, the strain gauge type torque sensor in the electromagnetic servo system according to the U.S. Patent, is not provided with sufficient protection, and is susceptable to disturbance such as dust, moisture, and external forces.

Moreover, in this electromagnetic servo system, in addition to the strain gauge type torque sensor, also provided is a limit switch for detecting the axial travel limit of an input shaft of the electromagnetic servo system. The limit switch is connected to the steering wheel side thereof which is axially slidable. The limit switch is arranged on the vehicle body side at the side of a stationary member. Also provided is an amplifier with a power unit. The amplifier receives signals from the torque sensor and the limit switch, and is used for controlling the output torque of the direct-current motor.

As a result of having so many parts, the entire system is complicated. Further, an operation control circuit of the direct-current motor is remarkably complicated as well.

Furthermore, in this servo system in which the input shaft is axially slidable as mentioned above, a drive section thereof including the input shaft, and output shaft, and the direct-current motor has a variable longitudinal dimension during operation. Thus, an additional provision of a complicated fixing mechanism is needed when applying the servo system to a certain mechanism or system such as a power steering system for vehicles.

On the other hand, later on, there has been proposed another electromagnetic servo system in Japanese Patent Lay-Open Print No. 58-141963 laid open on Aug. 23, 1983. The electromagnetic servo system according to the Japanese Lay-Open Print, is applied to a power steering system for vehicles. The servo system includes an electromagnetic motor coaxially arranged on a pinion shaft of the power steering system of a rack and pinion type which gives the pinion shaft an additional torque. This servo system as well has effectively solved the aforementioned conventional problems of the hydraulic servo system to a certain extent.

However, also in the electromagnetic servo system according to the Japanese Laid-Open Print, a torque detection and control mechanism are separately arranged, with respect to a drive section thereof including the electromagnetic motor. The torque detector is for detecting torque applied to the pinion shaft as an input side member. The control mechanism receives a detection signal from the detector to thereby control the output torque of the motor. As a result, like the case of the aforementioned U.S. Patent, the servo system is susceptive to disturbances and, is complicated.

Further, in the servo system according to the Japanese Lay-Open Print, the electromagnetic motor is controlled to always have torque output in proportion to the steering torque as applied to the pinion shaft from a steering wheel, thus being inherently bound to unnecessary consumption of power.

The present invention effectively solves the problems of a conventional electromagnetic servo system, in a further improved form.

SUMMARY OF THE INVENTION

According to the present invention, an electromagnetic servo unit comprises an outer casing, a first shaft and a second shaft both rotatably supported by the casing. An electric motor has an armature coaxially mounted on the second shaft and has a field arranged inside the casing. A torque detecting means detects torque applied to either of the first shaft and the second shaft. A control means receives a detection signal from the torque detecting means. The control means starts and controls the electric motor. The torque detecting means (8b, 22 16, 21, 12) is arranged inside the casing (1). The first shaft (8) and the second shaft (5) are mutually coaxially engaged with each other within the casing (1) through the torque detecting means (8b, 22, 16, 21, 12).

Preferably, the first shaft (8) and the second shaft (5) are coaxially supported by the casing (1). The torque detecting means (8b, 22, 16, 21, 12) comprises a part (8b) of the first shaft (8) in the casing (1), a part (16, 16a) of the second shaft (5) in the casing (1), an elastic means (22) interposed between the aforesaid part (8b) of the first shaft (8) and the aforesaid part (16, 16a) of said second shaft (5). A commutator (12) of the electric motor (101) is fixed on either of the first shaft (8) and the second shaft (5). A brush (21, 21) is secured to the other of the first shaft (8) and the second shaft (5) and is forced into contact with the commutator (12). The commutator (12) cooperates with the brush (21, 21) to start the electric motor (101) when a relative angular displacement between the first shaft (8) and the second shaft (5) is developed exceeding a predetermined angle range ($\theta$).

Accordingly, one object of the present invention is to provide an electromagnetic servo unit, in which a torque sensor can be effectively protected from disturbances such as dust, moisture, and external forces.

Another object of the present invention is to provide an electromagnetic servo unit, which is simplified in structure and effectively feasible of a compact and lightweight design, permitting fabrication at inexpensive cost, while sufficiently achieving necessary functions.

Still another object of the present invention is to provide an electromagnetic servo unit, which is able to effectively eliminate unnecessary consumption of power.

The above, and further objects, details and advantages of the present invention will become apparent from the following detailed description of a preferred embodiment of the invention when read in conjunction with the accompanying drawings.

DETAILED DESCRIPTION OF THE PREFERRED EMBODIMENT

Figure 1:
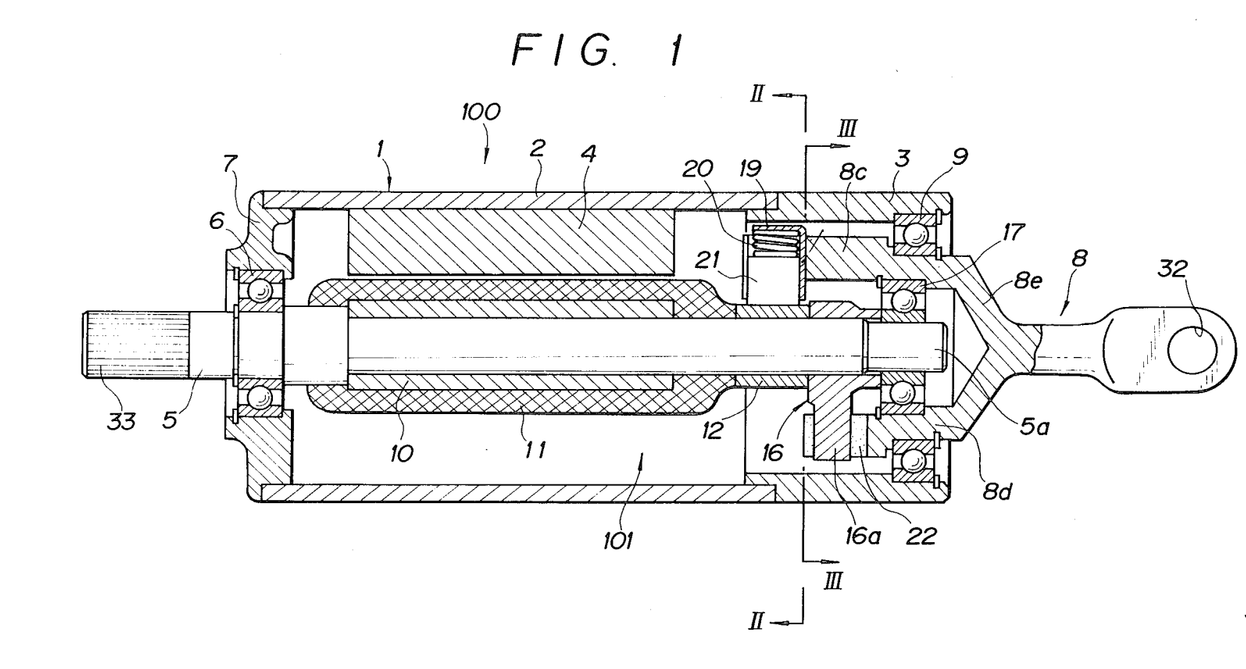
FIG. 1 shows a quarter-cutway longituidinal section of an electromagnetic servo unit according to the preferred embodiment of the invention.
Figure 2:
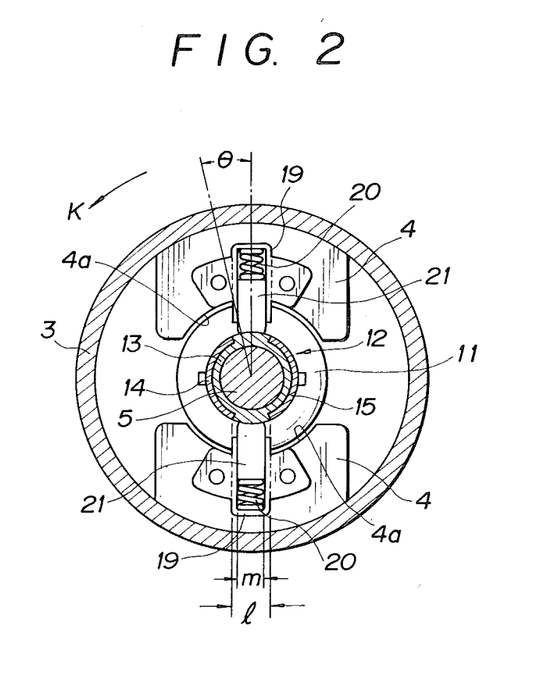
FIG. 2 is a sectional view taken along line II—II of FIG. 1.

Referring first to FIG. 1, designated at reference numeral 1 is cylindrical outer casing of an electromagnetic servo unit 100 according to a preferred embodiment of the invention. The casing 1 consists of an outside yoke 2 having a direct-current motor 101 built therein. A cylindrical support portion 3 supports a first shaft 8, and is fitted to the right end of the yoke 2. The casing 1 is to be fixed in place when the servo unit 100 is installed for use. The yoke 2 has fixed thereto a pair of magnets as field poles 4, 4 at symmetrical points (upper and lower points as shown in FIG. 2) on the inner circumference thereof. A lid 7 is fitted to the left end of the yoke. The lid 7 carrying a bearing 6 supporting a second shaft 5.

Figure 4:
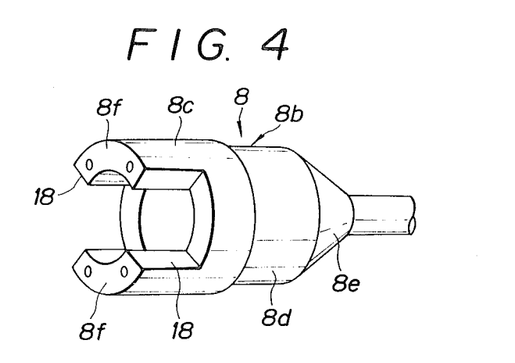
FIG. 4 is a perspective view of an essential part of a first shaft of the electromagnetic servo unit of FIG. 1.

The left part inner portion of the first shaft 8, as shown in FIG. 4, is formed as a hollowed cylindrical portion 8b opening leftwardly. The portion 8b has a lateral contour defined by a pair of sectorial cuts 18, 18 symmetrically to each other with respect to the axis of the shaft 8. The left cylindrical portion 8b of the shaft 8 consists of a large-diameter section 8c including the cuts 18 and a small-diameter section 8d contiguous thereto. A conical section 8e is formed between the small-diameter section 8d and the right part outer portion of the shaft 8.

A bearing 9 is interposed between the cylindrical support portion 3 of the casing 1 and the small-diameter section 8d of the hollowed cylindrical portion 8b of the first shaft 8. The bearing 9 rotatably supports the shaft 8, the axis of which is thereby made coincident with that of the cylinder 1.

A bearing 17 is installed inside the small-diameter section 8d. The bearing 17 supports an inner end part 5a of the second shaft 5. The bearing 17 cooperates with the left-side bearing 6 to rotatably support the shaft 5, making the axis thereof coincide with that of the first shaft 8.

The first shaft 8 and the second shaft 5 are formed at the outer ends thereof with a pin-insertion hole 32 and a spline 33, respectively, for connecting to respective members to be coupled therewith.

A cylindrical body 10 is fixed on the second shaft 5, substantially at the middle part thereof. The cylindrical body 10 is formed as a laminated steel core with an armature winding 11 of electric conductors longitudinally wound thereon. Moreover, a ccmmututor 12 is fixed on the second shaft 5, neighboring the right side of the winding 11. As shown in FIG. 2, commutator 12 comprises a cylindrical insulation member 13 having inlaid in the outer circumference thereof a pair of arcuate carbon resistance elements 14, 15 symmetrical to each other with respect to the axis of the shaft 5. The resistance elements 14, 15 consitute electric contact segments of the commutator 12, respectively. The commutator segments 14, 15 are spaced apart from each other by a distance along the circumference of the commutator 12 between respective opposing ends thereof, and are each respectively electrically connected at a circumferentially middle point thereof to one of both ends of the winding 11.

Figure 3:
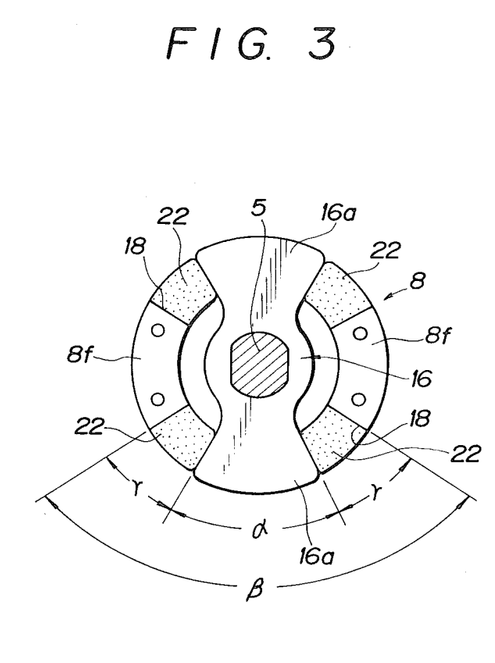
FIG. 3 is a sectional view taken along line III—III of FIG. 1.

Further, an engagement member 16 is fitted on the second shaft 5, between the commutator 12 and the bearing 17 inside the small-diameter section 8d of the first shaft 8. As shown in FIG. 3, engagement member 16 comprises a pair of sectorial arms portions 16a, 16a symmetrical to each other with respect to the axis of the shaft 5. The arm portions 16a, 16a are each respectively circumferentially extended through an angle $\alpha$. Along the section where the engagement member 16 is fitted, the shaft 5 is reduced to a circular section cut at both sides thereof, so that the member 16 integrally rotates with the shaft 5.

As shown in FIG. 3, the first shaft 8 is rotated at an angle of 90 degrees about its axis when compared with the position shown in FIG. 4. The cuts 18, 18 in the cylindrical portion 8b of the shaft 8 are each respectively extended through a circumference angle.

The large diameter section 8c, of the cylindrical portion 8b of the first shaft 8, has a pair of end faces 8f, 8f. Each of the end faces 8f, 8f respectively is provided with one of a pair of brush holders 19, 19 secured thereto as shown in FIGS. 1 and 2. One of a pair of brushes 21 is slidably fitted in each of the brush holders 19, 19. The brushes 21 are resiliently radially biased towards the commutator 12 with one of a pair of coil springs 20, 20. The brushes 21, 21 are electrically connected respectively to both terminals of a power source (not shown). Letting the width of each brush 21 be m, the circumferential distance between the commutator segments 14, 15 is dimensioned such that l>m. Normally, when the servo unit 100 is not operated, the brushes 21 are respectively brought into contact with both exposed portions of the insulation member 13 of the commutator 12.

The foregoing arrangment may be effectively modified such that a commutator is mounted on the first shaft 8 and proper number of brushes are secured to the second shaft 5.

As shown in FIG. 3, the sectorial arm position 16a, 16a of the engagement member 16, which is secured to the second shaft 5, are circumferentially centrally placed in the cuts 18, 18 of the first shaft 8. Two pairs of sectorial gaps are left therebetween at a circumference angle γ, respectively. These gaps are each respectively plugged with one of four rubber pieces 22, so that each of the arm portions 16a, 16a is normally biased to be circumferentially centered in a corresponding one of the cuts 18, 18. In this respect, not limiting them to rubber, the pieces 22 may be of any other elastic material similar thereto. Also, the degree of elasticity of such material may be properly determined.

Moreover, as shown in FIG. 2, the magnets 4, 4 have top faces 4a, 4a thereof radially outwardly curved to be effectively set in close vinicity to the winding 11 of the armature of a cylindrical configuration.

The first and second shafts 8, 5 are initially positioned relative to each other when neither of the shafts 8, 5 receives torque, such that the brushes 21, 21 are slipped at an angle of 90 electrical degrees relative to the arm positions 16a, 16a.

As understood from the foregoing description, the direct-current motor 101 comprises a field consisting of the magnets 4, 4, an armature consisting of the steel core 10 and the windings 11, and a commutating mechanism consisting of the commutator 12 and the brushes 21, 21. Fundamentally, the second shaft 5 constitutes an output shaft of the direct-current motor 101.

The function of the electromagnetic servo unit 100 will be described hereinbelow.

First, a description of an embodiment in which the first shaft 8 serves as an input shaft, and the second shaft 5 as an output shaft is as follows:

The servo unit 100 is now in a situation in which external torque rotates the input shaft 8 exemplarily in the direction of arrow K of FIG. 2. Thus, the brushes 21, 21, which are secured to the left end faces 8f, 8f of the large-diameter section 8c of the left cylindrical portion 8b of the input shaft 8, revolve in the direction K. In this respect, the arm porticns 16a, 16a are located in the cuts 18, 18 of the large-diameter section 4c and the rubber pieces 22 only transmit thereto torque of the input shaft 8.

Under such a condition, while the load borne by the output shaft 5 is smaller than a predetermined value, the output shaft 5 will rotate substantially integrally with the input shaft 8. Thus, the respective yielding deformations of the rubber pieces 22 is kept small, so that the relative angular displacement between the input shaft 8 and the output shaft 5, that is, the relative angular displacement or phase difference between each of the brushes 21, 21 and the commutator 12 is maintained within a predetermined angle range θ. Thus, each of the brushes 21, 21 circumferentially secured to the input shaft 8 is kept from entering contact with a corresponding one of the contact segments 14, 15 which serve resistance elements of the commutator 12 secured to the output shaft 5. Therefore, without electric currents sent into the armature winding 11, no effective torque is developed between the winding 11 and the magnets 4, 4. As a result, the external torque exerted on the input shaft 8 is substantially directly transmitted through the rubber pieces 22 to the output shaft 5.

On the other hand, as the load on the output shaft 5 becomes larger, the output shaft 5 fails to rotate in unison with the input shaft 8 which will cause a larger phase difference to develop therebetween. Thus, correspondingly the relative angular displacement therebetween increases as well as the yielding deformations of the rubber pieces 22. Particularly, when the predetermined value of the load on the output shaft 5 is exceeded, the relative angular displacement between the input and output shafts 8, 5 will exceed the predetermined angle range θ. Thus, the brushes 21, 21 are brought into contact with the commutator segments 14, 15 respectively. Accordingly, when electric currents are sent into the armature winding 11, the magnets 4, 4 and the winding 11 develop an electromagnetic torque therebetween, that is, a tendency of producing rotation in either direction, toward or opposite to K, depending on the direction of electric current across the winding 11. The electromagnetic torque may well be supposed here as designed to develop in the direction K, causing the armature to rotate in the same direction as the input shaft 8. Accordingly, the output shaft 5 is forced to rotate in the direction K by both the external torque transmitted through the input shaft 8 and the electromagnetic torque additionally developed in the direct-current motor 101. In this respect, the electromagnetic torque is developed only while the brushes 21, 21 are kept in contact with the commutator segments 14, 15. The direct-current motor 101 will stop developing torque when such contact is caused to be broken due to a change in the relative angular displacement between the input and output shafts 8, 5 due to corresponding rotation of the output shaft 5 or ceasing of rotation of the input shaft 8.

When the input shaft 8 is rotated by external torque applied to an extent that the relative angular displacement between the input and output shafts 8, 5 exceeds the predetermined angle range, electric currents will then be sent into the armature winding 11, which electromagnetically develops additional torque. Thus, output shaft 5 follows the rotation of the input shaft 8, so that the external torque applied to the input shaft 8 is apparently magnified when transmitted to the output shaft 5.

In other words, once the input shaft 8 is rotated to the extent that the brushes 21, 21 are brought into contact with the commutator segments 14, 15, then while such contact is maintained, electric current is sent into the armature winding 11. Therefore, the external torque applied to the input shaft 8 is subjected, in the course of transmission to the output shaft 5, to force multiplication due to an electromagnetic effect between the energized winding 11 and the magnets 4, 4, so that the output shaft 5 is rotated with larger torque. During such a phase, the armature winding 11 rotates at a low speed corresponding to the speed of rotation of the input shaft 8.

Such actions of the servo unit 100 as described above can be likewise achieved even when the input shaft 8 is rotated in the opposite direction to arrow K of FIG. 2.

Moreover, when the relative angular displacement between the input and output shafts 8, 5 is further increased with an increase in the load on the output shaft 5, contact areas respectively increase between the brushes 21, 21 and the commutator segments 14, 15 so that the armature winding 11, connected to the circumferentially middle points of the commutator segments 14, 15, has at both ends a decreased connection resistances with respect to the brushes 21, 21, respectively, thereby increasing the current to the armature winding 20. It is thus possible to magnify the electromagnetic torque provided by the motor 101 in accordance with the load on the output shaft 5.

The rubber pieces 22 yield in accordance with torque applied to the input shaft 8. Therefore, when the brushes 21, 21 are kept in contact with the commutator segments 14, 15 and the torque applied to the input shaft 8 is decreased, the rubber pieces 22 have correspondingly restored dimensions. This permits the arm portions 16a, 16a of the engagement member 16 to be additionally displaced towards the initial central positions in the cuts 18, 18. Particularly, when the torque applied to the first shaft 8 is reduced below a predetermined value, the contact between the brushes 21, 21 and the segments 14, 15 will then be broken, interrupting current to the armature winding 11, thus causing electromagnetic torque at the motor 101 to immediately disappear.

Further, as understood from the above, the servo unit 100 is operable only 90 degrees or less on either side of the neutral position of the input shaft 8.

The electromagnetic servo unit 100 described hitherto can be adapted as well as to an embodiment in which the second shaft 5 is used as an input shaft, and the first shaft 8, as an output shaft.

In such an embodiment, when the relative angular displacement between the input shaft 5 and the output shaft 8 exceeds the predetermined circumference angle $\theta$ with an increase in the magnitude of load on the output shaft 8 exceeding a predetermined value, the motor 101 starts to electromagnetically develop additional torque directly exerted on the input shaft 5. In this case, the servo unit 100 is also operable only 90 degrees or less on either side of the neutral position of the input shaft 5.

The principle function of the servo unit 100 in such a case will be easily understood from the foregoing description and will not be detailed.

When the second shaft 5 is used as an input shaft, and where the torque developed by the motor 101 is exerted on the input shaft 5, it may be advisable that all the torque applied to the output shaft 8 is to be exerted through the rubber pieces 22.

Figure 5:
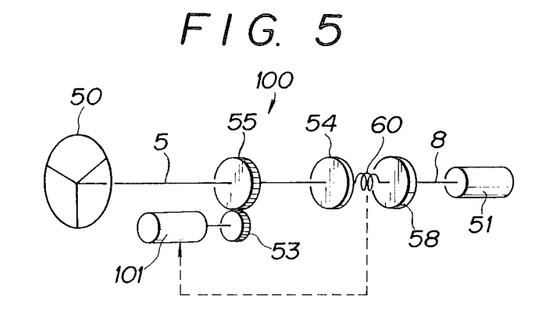
FIG. 5 is a schematic representation of a power steering system with the electromagnetic servo unit of FIG. 1.

FIG. 5 shows a schematic diagram of a power steering system for vehicles constituted as the combination of a well-known steering system and the aforementioned electromagnetic servo unit 100 as conceptionally modelled and as applied by using the second shaft 5 as an input shaft and the first shaft 8 as an output shaft. Designated at reference numeral 50 is a steering wheel of the steering system. The steering wheel 50 is connected to the input shaft 5 of the servo unit. Operational member 51, such as a pinion shaft of a rack and pinion gearing of the system, is connected to the output shaft 8 of the unit. Between the input shaft 5 and the output shaft 8, more particularly, between one-end part 54 of the former and one-end part 58 of the latter opposite thereto, there is interposed a torque sensor 60 having a function of torque transmission. The sensor 60 corresponds to the combination of the arm portions 16a, 16a of engagement member 16 and the rubber pieces 22 in the cuts 18, 18 of cylindrical portion 8b of first shaft 8, along with the brushes 21, 21 and commutator 12 as shown in FIGS. 1–3. Sensor 60 may be constituted by other suitable means. To control the electromagnetic power assistance, a sensor signal is fed back to the electric motor 101. A gear 53 is mounted on the output shaft of the motor 101. The gear 53 meshes with another gear 55 mounted on the input shaft 5. The gears 53 and 55 are conceptionally existing members, since in the aforementioned embodiment the input shaft 5 itself can serve as an output shaft of the electric motor 101. When a torque developed between the input and the output shafts 5, 8 is detected by the torque sensor 60, the electric motor 101 will operate in response thereto, to apply an additional torque to the input shaft 5. Thereby, the output shaft 8 is given a larger torque than would be caused without the motor 101.

Further, in such an application of the servo unit as shown in FIG. 5, the steering wheel 50 is preferably of a type that rotation of which is limited within 90 degrees or less on either side of its neutral position. For example, the steering wheel 50 is that of a racing car.

In the aforementioned power steering system, an electromagnetic torque is added to the input shaft 5, while the torque sensor 60 detects representative value, such as the absolute value, of a torque developed at the output shaft 8. Thus, even at fine fluctuations of the load, which otherwise would be disturbances to the torque output characteristic, a controlled power assistance is achieved in which a torque developed at the input shaft 5 is magnified and transmitted to the output shaft 8 in a stable manner.

Further, in the power steering system of FIG. 5, when the relative angular displacement between the input shaft 5 and the output shaft 8 is increased beyond the predetermined phase difference with an increase in the load on the output shaft 8, there will be a proportional increase in the respective contact areas between the brushes 21, 21 and the commutator segments 14, 15. In addition, there will be a decrease in the respective resistances between the brushes 21, 21 and the armature winding 11. Therefore, the electric current to the armature winding 11 will increase so that the torque produced by the electric motor 101 becomes larger in response to the increase in load at the output shaft 8.

Figure 6:
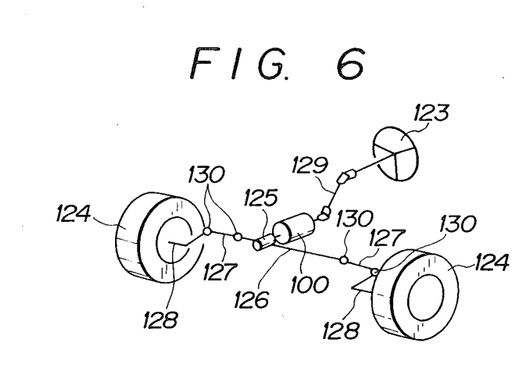
FIGS. 6 and 7 show two examples of the layout of a power steering system for vehicles including the electromagnetic servo unit of FIG. 1.
Figure 7:
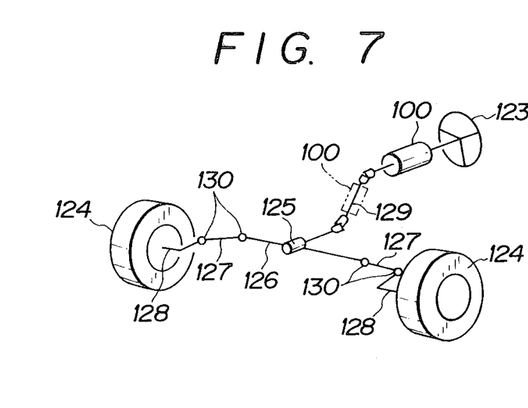

FIGS. 6 and 7 show two examples of a layout of a power steering system for vehicles including the aforementioned electromagnetic servo unit 100. Designated at reference numeral 123 is a steering wheel, 124, 124 represents a pair of front wheels, 125 is a pinion, 126 is a rack, 127, 127 are a pair of tie rods, 128, 128 are a pair of knuckle, 129 is a universal joint, and 130, 130 are a pair of ball joints. Further, the steering wheel 123 is preferably that of a racing car, similarly to the aforesaid steering wheel 50. The electromagnetic servo unit 100 is disposed between the universal joint 129 and the pinion 125 as shown in FIG. 6, between the steering wheel 123 and the universal joint 129 as shown by solid line in FIG. 7, or in the universal joint 129 itself as shown by dashed line FIG. 7.

Figure 8:
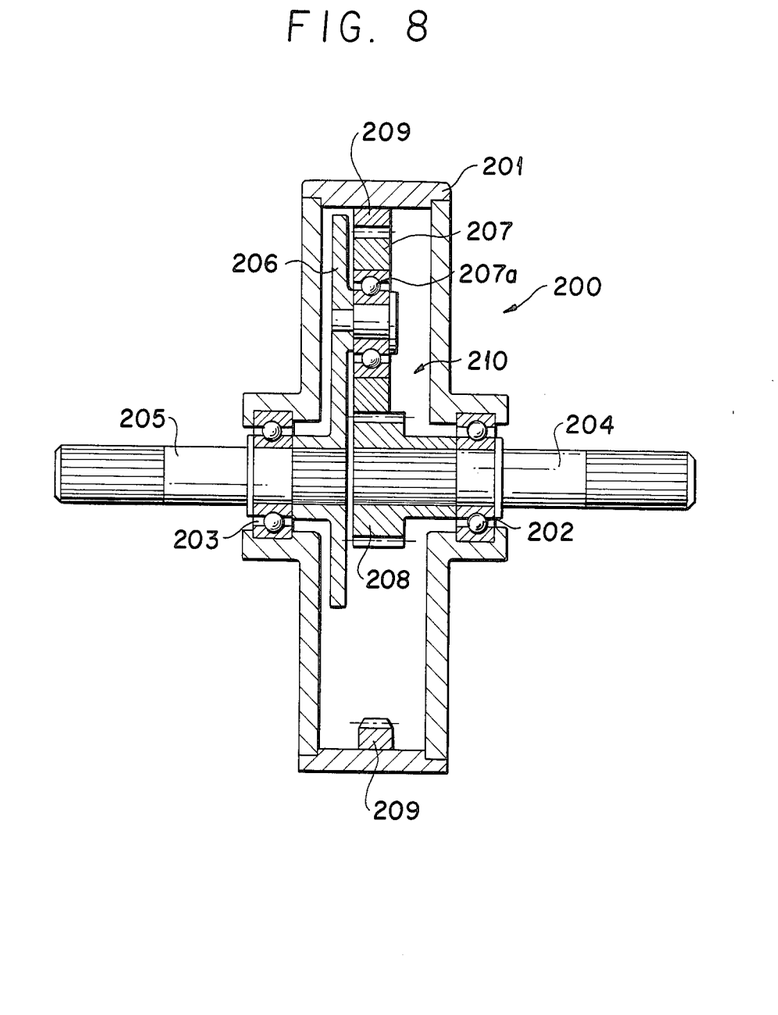
FIG. 8 is a longitudinal sectional view of a reduction gear mechanism to be disposed between a steering wheel of the vehicle and the electromagnetic servo unit of FIGS. 6 and 7.

When the servo unit 100 is in a steering system of a conventional vehicle in which a steering wheel (not shown) is rotatable over an angle of 360 degrees or more on either side of its neutral position, a reduction gear mechanism 200 as shown in FIG. 8 is disposed between the steering wheel and one of the first and second shafts 8, 5 which is used as an input shaft.

The reduction gear mechanism 200 comprises a cylindrical casing 201 which is fixed to a vehicle body (not shown). A bearing 202 rotatably supports an input shaft 204. Input shaft 204 is connected at the outer end thereof to the steering wheel. An output shaft 205 is rotatably supported by casing 201 through a bearing 203. The outer end of the shaft 205 is connected to the input shaft of the servo unit 100 with/without a universal joint (not shown) of a known type. The rotation of the input shaft 204 is transmitted to the output shaft 205. The rotation is suitably reduced in a rotation number or angle, through a planetary gearing 210. The planetary gearing 210 comprises a sun gear 208 fitted on the inner end of the input shaft 204. A ring gear 209 is formed along the inner circumference of the casing 201. A trio of planet gears 207 engage with the sun gear 208 and the ring gear 209. Each of the planet gears 207 is rotatably supported through a bearing 207 by a disk-like carrier 206 which is fitted on the inner end of the output shaft 205.

When the input shaft 204 is rotated by the steering wheel, the output shaft 205 is rotated in a reduced rotation number or angle relative to that of the input shaft 204, by virtue of the planetary gearing 210. A reduction ratio of the reduction gear mechanism 200 is prepared such that the maximum rotation angle of the output shaft 205 is smaller than 90 degrees on either side of its neutral position as the input shaft, i.e. the steering wheel is rotated up to its maximum rotation angle on its either side, e.g. generally 540 degrees.

It is apparent that any other known reduction gear mechanism can be used instead of the mechanism 200. Further, it is a matter of design choice to provide a reduction gear mechanism or increment gear mechanism between a rack and pinion mechanism of the vehicle and that one of the first and second shafts 8, 5 which is used as an output shaft.

As understood from the foregoing description, according to the present invention, an electromagnetic servo unit has integrated therewith, as component parts of a simplified constitution, a torque detecting mechanism for detecting a torque applied to an input shaft, as well as a control mechanism adapted to cooperate with the torque detecting mechanism to receive a signal therefrom for controlling an output torque of an electric motor. Accordingly, in addition to the torque detecting mechanism being effectively protected against dust, moisture, external forces, and the like which otherwise would be disturbances, the structure of the servo unit itself is favorably simplified. Also, implementation can be achieved in applications of the unit to suitable places such as between a steering wheel and a pinion shaft of a rack and pinion type steering system for vehicles, as exemplarily shown in FIGS. 6 and 7.

Moreover, the electric motor starts operating only when an output shaft receives a load exceeding a predetermined value, thus effectively avoiding unnecessary consumption of power.

Further, the simplified constitution of the torque detecting mechanism successfully permits ensured performance as well as quicker responsiveness of the servo unit.

Still more, the input shaft and the output shaft are substantially directly engaged with each other, without the need of providing a separate fail-safe mechanism.

It will be apparent that, not limiting to a power steering system for vehicles, the electromagnetic servo unit according to the invention may be applied to any other system in which a torque larger than that input is needed to be output when necessary.

Although there has been described what is at present considered to be the preferred embodiment of the invention, it will be understood that the present invention may be embodied in other specific forms without departing from the spirit or essential characteristics thereof. The present embodiment is therefore to be considered in all respects as illustrative and not restrictive. The scope of the invention is indicated by the appended claims rather than by the foregoing description.

I claim:

1. An electromagnetic servo unit, comprising:
   an outer casing;
   a first shaft and a second shaft both rotatably supported by said casing;
   an electric motor having an armature coaxially fixed on said second shaft and a field arranged inside said casing;
   torque detection means for detecting torque applied to either of said first shaft and said second shaft, said torque detecting means includes
   a part of said first shaft in said casing,
   a part of said second shaft in said casing;
   elastic means interposed between said part of said first shaft and said part of said second shaft; and
   control means for receiving a detection signal from said torque detecting means, said control means for starting and controlling said electric motor, wherein
   said torque detecting means is arranged inside said casing; and
   said first shaft and said second shaft are mutually actuatably engaged with each other within said casing through said torque detecting means.

2. An electromagnetic servo unit according to claim 1, wherein
   said first shaft and said second shaft are coaxially supported by said casing;
   said torque detecting means (8b, 22, 16, 2, 2) comprises:
   a commutator of said electric motor fixed on either of said first shaft or said second shaft; and
   a brush secured to the other of said first shaft or said second shaft and forced into contact with said commutator and wherein
   said commutator cooperates with said brush to start said electric motor when a relative angular displacement between said first shaft and said second shaft is exceeding a predetermined angle range.

3. An electromagnetic servo unit according to claim 2, wherein:
   said part of said first shaft in said casing comprises a cylindrical portion formed at the inner end of said first shaft, and said cylindrical portion having a cut at a lateral side thereof;
   said part of said second shaft in said casing comprises an arm portion formed at the inner end of said second shaft, and said arm portion extending into said cut; and said elastic means comprises an elastic member interposed between said cut and said arm portion to plug a space therebetween.

4. An electromagnetic servo unit according to claim 3, wherein:

said commutator of said electric motor fixed on either of said first shaft or said second shaft is constituted with a cylindrical insulating member as a body part thereof and a pair of arcuate resistance members fixed to the circumference of said insulating member, such that said commutator has along the circumference thereof adjacent to said resistance members an exposed portion of said insulating member exposed to have a predetermined width wider than a width of each said brush secured to the other of said first shaft or said second shaft, so that a contact surface of each said brush is brought into contact wholly with said exposed portion of said insulating member when said relative angular displacement between said first shaft and said second shaft is kept within said predetermined angle range, and at least partially into contact with one of said resistance members, when said relative angular displacement exceeds said predetermined angle range; and said electric motor starts when each said brush is brought into contact with said resistance members.

5. An electromagnetic servo unit according to claim 4, wherein:

said resistance member of said commutator of said electric motor comprises a pair of arcuate resistance segments symmetrically fixed on the circumference of said cylindrical insulating body;

said brush secured to said other one of said first shaft or said second shaft comprises a pair of brush elements symmetrically fixed onto same; and when neither of said first shaft not said second shaft is applied with torque, said brush elements are each respectively forced into contact with the circumferentially middle part of said exposed portion of said insulating memher (13) between said resistance segments so that said electric motor is kept from starting.

6. An electromagnetic servo unit according to claim 5, whererin:

said arcuate resistance segments of said commutator are each respectively electrically connected at the circumferentially wide part thereof to either of one of both ends of said winding of said armature and one of both poles of a power source.

7. An electromagnetic servo unit according to clam 6, wherein:

said control means is arranged inside said casing and comprises said resistance segments of said commutator and said brush elements.

8. An electromagnetic servo unit according to claim 1, wherein:

said control means is arranged inside said casing.

9. An electromagnetic servo unit according to claim 1, wherein:

said first shaft and said second shaft are to serve as an input shaft and an output shaft, respectively.

10. An electromagnetic servo unit according to claim 1, wherein: said first shaft and said second shaft are to serve as an output shaft and an input shaft, respectively.

* * * * *